B. F. LINSE.
WEEDER.
APPLICATION FILED OCT. 17, 1916.
1,226,980.
Patented May 22, 1917.
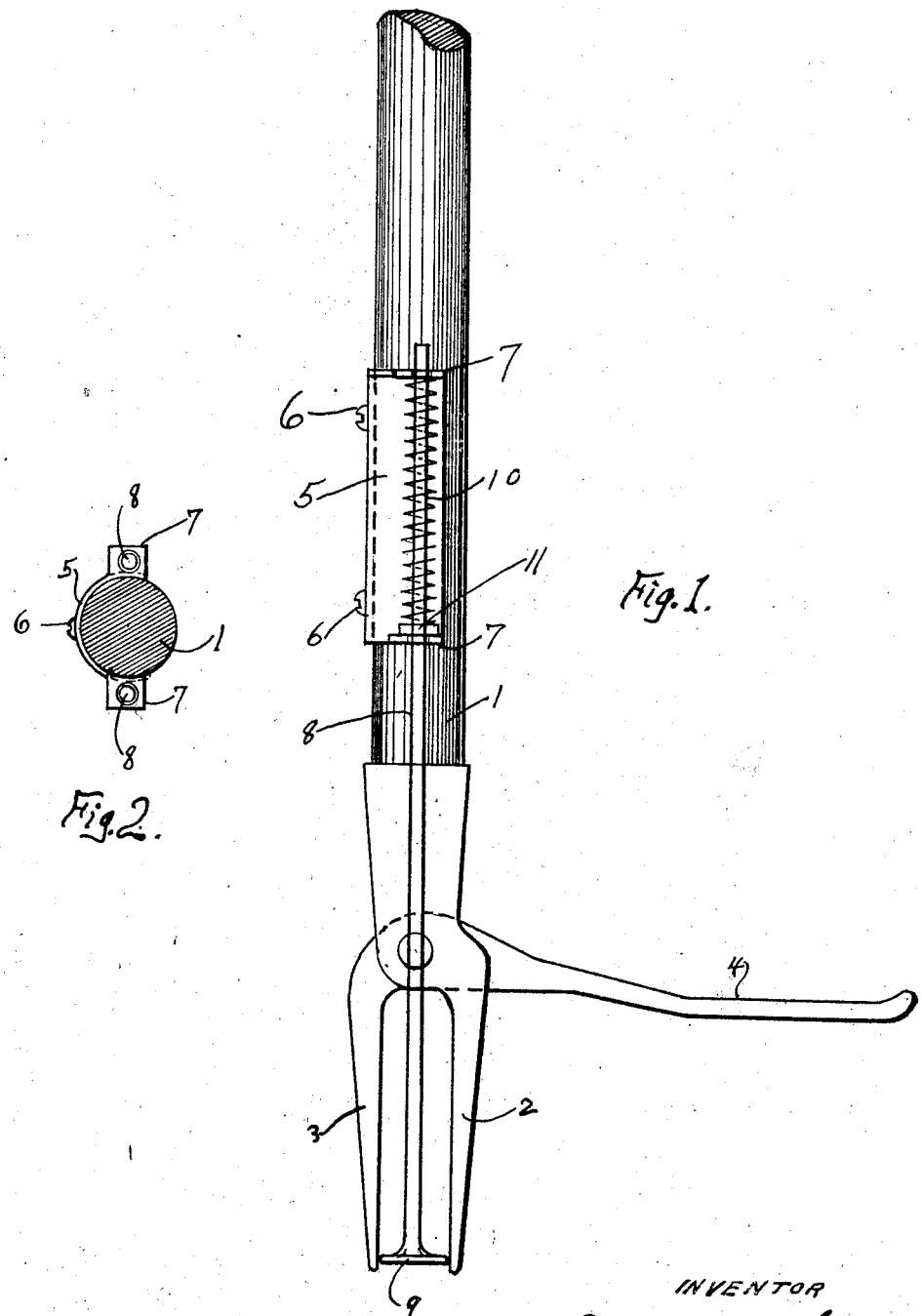

UNITED STATES PATENT OFFICE.

BENJAMIN F. LINSE, OF SEATTLE, WASHINGTON.

WEEDER.

1,226,980.

Specification of Letters Patent.

Patented May 22, 1917.

Application filed October 17, 1916. Serial No. 126,316.

*To all whom it may concern:*

Be it known that I, BENJAMIN F. LINSE, a citizen of the United States, and a resident of Seattle, in the county of King and State of Washington, have invented certain new and useful Improvements in Weeders, of which the following is a full, true, and exact specification.

My invention relates to weeders and has for its principal object to provide an automatic means for ejecting the weed from between the prongs of the digger.

Other objects will appear as my invention is more fully explained in the following specifications, illustrated in the accompanying drawings and pointed out in the appended claim.

In the drawings Figure 1 is a side elevation of a weed puller showing my device in operative position. Fig. 2 is a cross sectional plan of my device shown attached to the staff of the digger.

Referring more particularly to the drawings, numeral 1 indicates a staff upon the lower end of which is secured a stationary prong 2. A movable prong 3 is pivoted to prong 2 and is provided with a foot lever 4. This type of weeder is in common use and I am therefore showing my device attached thereto, but it will be understood that my device is equally applicable to many other types of weeders. My device proper consists of a yoke 5 which fits onto staff 1 and which is removably attached thereto by means of screws 6 or other suitable means. Lugs 7 are outstanding from yoke 5 and are positioned in line vertically and also on opposite sides of staff 1. The lugs are perforated to receive vertical rods 8 one on each side of the staff 1. Rods 8 are slidable within the openings in the lugs and are attached at their lower end to a cleaner 9 which is adapted to move vertically between the prongs 2 and 3. Coil springs 10 wound about rods 8 intermediate the lugs 7 are attached at their lower ends to collars 11 which are secured to rods 8 while the upper ends of the springs bear against the upper lugs 7. It will be understood that the tendency of the springs 10 is to force the cleaner 9 down into position as shown but that the cleaner 9 may be shoved up between the prongs 2 and 3 and the springs 10 compressed. This last operation takes place when the prongs are forced into the ground. When the prongs are withdrawn from the ground and the removable prong is released, the springs 10 force the rods 8 and cleaner 9 down to the position as shown in the drawings with the result that the weed is ejected from between the prongs. My device is removably attachable to many types of weeders and with slight modification would fit a variety of different shaped staffs.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

The combination with a pronged weed puller of removably attachable automatic prong cleaning means, whereby when the digger has been withdrawn from the ground the weed is ejected from the prongs of the digger; said means including a yoke removably attached to the staff of the digger, rods slidably mounted in lugs which are integral with the said yoke, a cleaner attached to the lower ends of said rods and interposed between the said prongs, and coil springs wound about and attached to the said rods and reacting against the said yoke, whereby the cleaner is normally retained at a position adjacent the tips of the prongs.

BENJAMIN F. LINSE.